(12) United States Patent
Acharya et al.

(10) Patent No.: US 10,740,032 B2
(45) Date of Patent: Aug. 11, 2020

(54) RESOURCE ALLOCATION FOR ATOMIC DATA ACCESS REQUESTS

(71) Applicant: Arm Limited, Cambridge (GB)

(72) Inventors: Chiranjeev Acharya, Sheffield (GB); Sean James Salisbury, Appley Bridge (GB); Eduard Vardanyan, Sheffield (GB); Arthur Brian Laughton, Hathersage (GB)

(73) Assignee: Arm Limited, Cambridge (GB)

( * ) Notice: Subject to any disclaimer, the term of this patent is extended or adjusted under 35 U.S.C. 154(b) by 131 days.

(21) Appl. No.: 16/148,295

(22) Filed: Oct. 1, 2018

(65) Prior Publication Data

US 2019/0163400 A1 May 30, 2019

(30) Foreign Application Priority Data

Nov. 29, 2017 (EP) .................................... 17204450

(51) Int. Cl.
*G06F 3/06* (2006.01)
*G06F 9/52* (2006.01)
*G06F 30/30* (2020.01)
*G06F 119/18* (2020.01)

(52) U.S. Cl.
CPC .......... *G06F 3/0659* (2013.01); *G06F 3/0604* (2013.01); *G06F 3/0656* (2013.01); *G06F 3/0673* (2013.01); *G06F 9/52* (2013.01); *G06F 30/30* (2020.01); *G06F 2119/18* (2020.01); *G06F 2209/5014* (2013.01)

(58) Field of Classification Search
None
See application file for complete search history.

(56) References Cited

U.S. PATENT DOCUMENTS

| | | | |
|---|---|---|---|
| 6,370,625 B1 | 4/2002 | Carmean et al. | |
| 7,797,489 B1* | 9/2010 | Jiang | G06F 3/0617 |
| | | | 711/114 |
| 9,563,511 B1* | 2/2017 | Foley | G06F 11/1092 |
| 10,289,507 B1* | 5/2019 | Malwankar | G06F 3/0635 |
| 2014/0279905 A1* | 9/2014 | Muniswamy-Reddy | |
| | | | G06F 16/27 |
| | | | 707/639 |
| 2015/0154139 A1 | 6/2015 | Hagspiel et al. | |
| 2016/0043965 A1* | 2/2016 | Goldenberg | H04L 47/801 |
| | | | 709/225 |

(Continued)

OTHER PUBLICATIONS

Extended EP Search Report for EP17204450.5, dated May 18, 2018, 10 pages.

*Primary Examiner* — Charles Rones
*Assistant Examiner* — Hewy H Li
(74) *Attorney, Agent, or Firm* — Nixon & Vanderhye P.C.

(57) ABSTRACT

Data access routing circuitry 4, 6 is provided for routing data access request to a selected destination node. The data access routing circuitry supports read requests requiring a read response, write requests requiring a write response and at least one type of atomic data access request requiring both a read response and a write response. Resource allocation circuitry 70, 71 is provided to control allocation of resource for handling data access requests which require a read response. The resource allocation circuitry 70, 71 reserves resource for handling the at least one type of atomic data access request and prevents use of the reserved resource 76 for handling read requests.

15 Claims, 8 Drawing Sheets

(56) References Cited

U.S. PATENT DOCUMENTS

2016/0048354 A1\* 2/2016 Walsh ................ G06F 12/0246
711/103

\* cited by examiner

| request type | Requesting node specifies: | Destination node provides response: |
|---|---|---|
| Read | target address | Read response providing data read from addressed location |
| Write | target address, Wdata | Write response confirming servicing of write operation to write Wdata to addressed location |
| Atomic Store | target address, Wdata | Write response confirming servicing of write operation to write fn(Wdata, data read from addressed location) to addressed location |
| Atomic Load | target address, Wdata | Write response confirming servicing of write operation to write fn(Wdata, data read from addressed location) to addressed location<br>Read response providing old/new data of addressed location |
| Atomic Swap | target address, Wdata | Write response confirming servicing of write operation to write Wdata to addressed location<br>Read response providing old data read from addressed location |
| Atomic Compare | target address, Cdata, Sdata | Write response confirming servicing of conditional write (conditional on comparison between Cdata and data read from addressed location) of Sdata to addressed location<br>Read response providing old/new data of addressed location or indication of comparison result | atomic data access request requiring both read write response { Atomic Load, Atomic Swap, Atomic Compare }

RESOURCE ALLOCATION FOR ATOMIC DATA ACCESS REQUESTS

This application claims priority to EP Patent Application No. 17204450.5 filed 29 Nov. 2017, the entire contents of which is hereby incorporated by reference.

BACKGROUND

Technical Field

The present technique relates to the field of data processing. More particularly it relates to the routing of data access requests.

Technical Background

An integrated circuit may include a number of components which may communicate by issuing data access requests specifying a target memory address. Data access routing circuitry (e.g. an interconnect or network on chip) may be provided which manages routing of a data access request from a given requesting node of the integrated circuit to the appropriate destination node depending on the target address specified by the data access request.

SUMMARY

At least some examples provide an apparatus comprising: data access routing circuitry responsive to a data access request received from a requesting node specifying a target address, to issue signals for triggering a selected destination node selected from among a plurality of destination nodes to service the data access request;

wherein when the data access request is a read request received from the requesting node over a read request channel, the data access routing circuitry is configured to issue signals for triggering the selected destination node to provide a read response dependent on data read from a target storage location identified by the target address;

when the data access request is a write request received from the requesting node over a write request channel, the data access routing circuitry is configured to issue signals for triggering the selected destination node to provide a write response confirming servicing of a write operation for writing data to the target storage location;

when the data access request is at least one type of atomic data access request received from the requesting node over the write request channel, the data access routing circuitry is configured to issue signals for triggering the selected destination node to provide both the read response and the write response;

the data access routing circuitry comprises resource allocation circuitry to control allocation of resource for handling data access requests which require a read response; and the resource allocation circuitry is configured to reserve resource for handling the at least one type of atomic data access request and prevent usage of the reserved resource for handling read requests.

At least some examples provide a method comprising: in response to a data access request received from a requesting node specifying a target address, issuing signals for triggering a selected destination node selected from among a plurality of destination nodes to service the data access request;

when the data access request is a read request received from the requesting node over a read request channel, issuing signals for triggering the selected destination node to provide a read response dependent on data read from a target storage location identified by the target address;

when the data access request is a write request received from the requesting node over a write request channel, issuing signals for triggering the selected destination node to provide a write response confirming that a write operation for writing data to the target storage location has progressed to a predetermined point;

when the data access request is at least one type of atomic data access request received from the requesting node over the write request channel, issuing signals for triggering the selected destination node to provide both the read response and the write response; and controlling allocation of resource for handling data access requests which require a read response, wherein resource is reserved for handling the at least one type of atomic data access request to prevent usage of the reserved resource for handling read requests.

At least some examples provide an electronic design file comprising integrated circuit defining data representing a design of an integrated circuit comprising the apparatus as discussed above. The electronic design file may be stored on a storage medium. The storage medium may be a non-transitory storage medium.

Further aspects, features and advantages of the present technique will be apparent from the following description of examples, which is to be read in conjunction with the accompanying drawings.

BRIEF DESCRIPTION OF THE DRAWINGS

FIG. 3 is a table showing an example of different types of data access transaction which may be handled by the interconnect;

DESCRIPTION OF EXAMPLES

Figure 1:
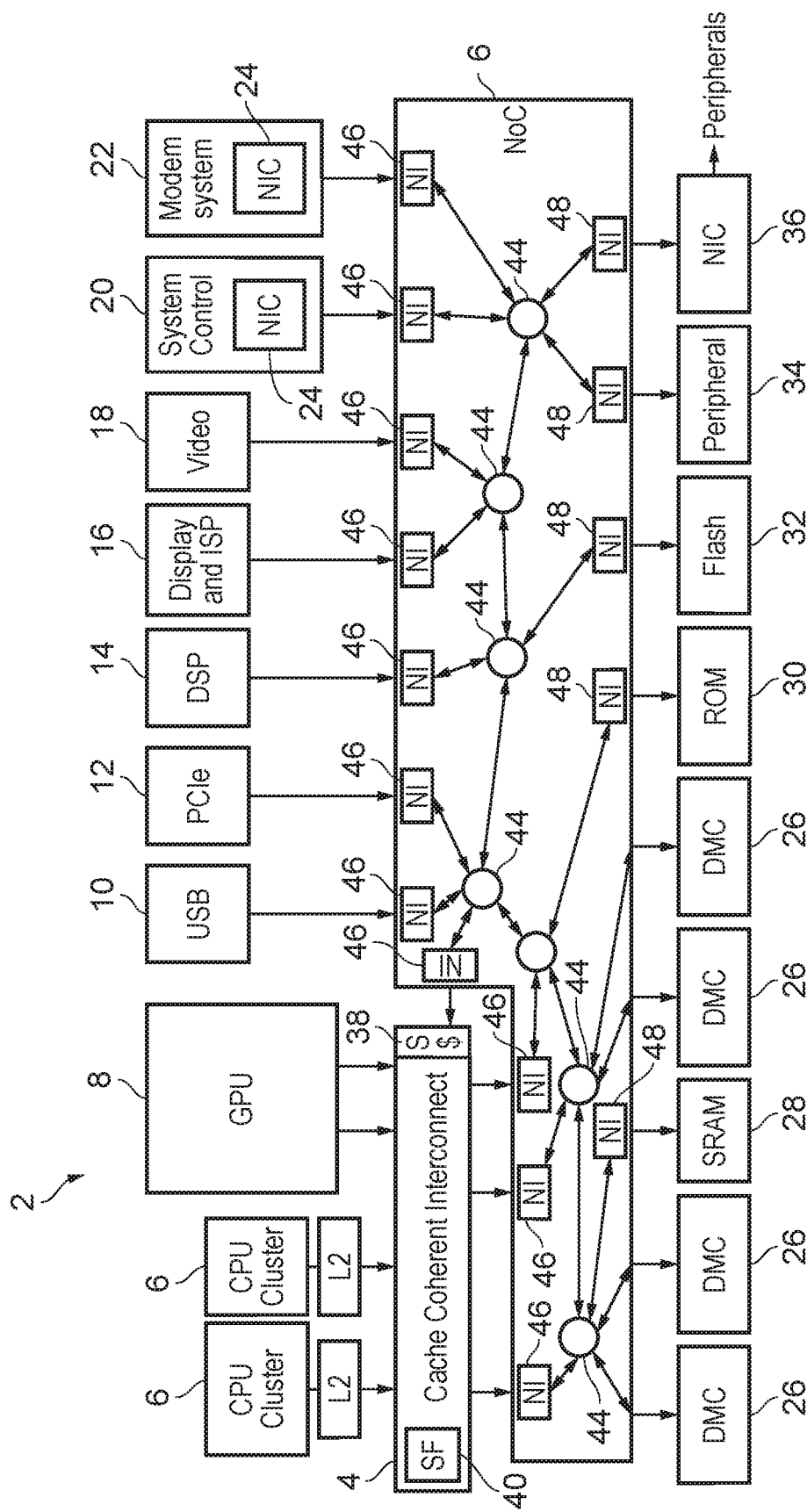
FIG. 1 schematically illustrates an example of a data processing system having a number of components which communicate via an interconnect or network on chip.

An apparatus, such as an integrated circuit or system on chip, may have data access routing circuitry responsive to a data access request received from a requesting node specifying a target address, to issue signals for triggering a selected destination node selected from among a plurality of destination nodes to service the data access request. For example, the data access routing circuitry may comprise an interconnect or a network on chip. The data access routing circuitry may support a number of types of request. When the data access request is a read request received from the requesting node over a read request channel, the data access routing circuitry may issue signals for triggering the selected destination node to provide a read response which depends on data read from a target storage location identified by the target address. When the data access request is a write request received from the requesting node over a write request channel, the data access routing circuitry may issue signals for triggering the selected destination node to provide a write response confirming servicing of a write operation for writing data to the target storage location.

Also, the data access routing circuitry may support at least one type of atomic data access request. When the data access request received from the requesting node over the write request channel is at least one type of atomic data access request, the data access routing circuitry may issue signals for triggering the selected destination node to provide both the read response and the write response. Hence, unlike read requests and write requests which return only one of the read response and the write response respectively, the at least one type of atomic data access request may return both a read response and a write response. This can be useful, for example, for operations which require a value to be read from a target storage location and a relatively simple logical or arithmetic operation to be applied to that read value and then a value written to the target storage location in dependence on the result of that operation. Without support for atomic requests it would be required to issue a read request to read the data value to the requesting node, and for the requesting node to perform the required operation on the read value before issuing a separate write request to write the result back to the target storage location. If the destination node can support processing of such transactions directly then this can reduce the length of time between the read and the write making it simpler to ensure that the read and write are observed atomically by other nodes of the circuit and reducing the complexity and managing conflicting accesses to shared resource by different requesting nodes. It can be useful to share the write request channel between write requests and atomics, as both writes and atomics may provide data from the requesting node to be forwarded to the destination node.

However, the atomic data requests may require both read resource and write resource to be allocated to the request by the data access routing circuitry. The data access routing circuitry may have resource allocation which controls allocation of resource for handling data access requests which require a read response. Hence, the resource allocation circuitry may control allocation of that read resource for both read requests and atomic data access requests which require a read response. However, as the volume of read traffic may often be higher than the volume of atomic data access request traffic, there is a risk that all the read resource available may already have been allocated to handling read requests, which could block servicing of the at least one type of atomic data access request. As the at least one type of atomic data access request is received over the write request channel, subsequent write requests may be blocked by the pending atomic. Hence, even if independent read and write channels are provided, this could mean that heavy volume of read traffic may block progress of writes due to the presence of the atomics, which may often be undesirable as some applications may have a requirement that writes should not be blocked by reads.

The resource allocation circuitry may reserve resource for handling the at least one type of atomic data access request and prevent usage of the reserved resource for handling read requests. This means that there is a portion of the resource which is guaranteed to be available for handling atomic data access requests so that atomic data access requests can make progress even if there is a high volume of read traffic, to reduce the chance of heavy read traffic blocking requests on the write channel. This can improve performance in the data access routing circuitry as a whole and hence within the overall system which uses the data access routing circuitry.

In some implementations, the data access routing circuitry could partition the resource available for handling requests which require a read response so that a first portion of the resource is used only for read requests and a second portion is used only for the at least one type of atomic data access request. However, it can be more efficient for at least a portion of the resource to be shared for use by both read requests and the at least one type of atomic data access request, so that if one of the read or atomic data access requests is received in low volume then the other type of request can make use of the shared resource. This can lead to more efficient resource usage and reduce the overall amount of resource required.

The data access routing circuitry may have read channel control circuitry for managing allocation of read resources for data access request received on the read request channel, and write channel control circuitry to manage allocation of resources for data access requests received on the write request channel. Hence, by providing separate control circuits for the read and write request channels then this can enable more efficient processing of the read and write request respectively which may have different resource requirements. In some cases the read and write channels may receive the requests over physically separate signal paths. Alternatively, the requests could be received from the requesting node over a common bus but separated on receipt and managed separately within the data access routing circuitry.

The data access routing circuitry may stall a read request when the only available resource for handling read requests or atomic data access requests which require a read response is the reserved resource which has been reserved for handling the at least one type of atomic data access request. Hence, even though there is some resource which could be used, as it has be reserved for atomics it is not allowed to be used for reads and the read request is stalled to ensure that any subsequently received atomic request can be handled using the reserved resource to avoid blocking the write channel.

There are a number of ways of reserving the resource. In one example the reserved resource may comprise a dedicated resource reserved exclusively for handling the at least one type of atomic data access request. Hence the dedicated resource may not be allowed to be used for any read requests. A remaining portion of the resource for handling requests requiring a read response could be used either for read requests or the at least one type of atomic data access requests.

Providing dedicated resource for handling atomic requests can enable a reduction in the amount of logic provided for remaining resource for handling read requests. For example, if the dedicated resource comprise a reserved slot in a buffer which can only be used for handling atomic data access requests, then control logic for performing an operation specific to atomics which is not required for reads could be provided for the dedicated slots reserved for atomics, but could be omitted from at least some of the other slots. As it is more likely that the atomics will be handled using the reserved slots, some of the other slots may be made incapable of handling atomics to save on circuit area and power consumption of the associated atomic-request-control logic so that it is not necessary to provide the full capability logic for handling both read and atomic requests in every buffer slots.

Alternatively, it is not necessary to dedicate certain resource exclusively for atomics in order to perform the reservation. Another approach may be that all of the resource can be used for either atomic data access requests or read requests, but when an in-use resource level exceeds a threshold, then the resource allocation circuitry may reserve any remaining resource for handling the at least one type of atomic data access request. Hence, rather than a particular resource being permanently dedicated to handling the atomics, the resource allocation circuitry may use a virtual reservation approach, in which until the in use resource level exceeds the threshold any resource can be used for any type of request, but once the in-use resource level exceeds the threshold then the last few remaining instances of resource may be used only for at least one type of atomic data access request.

The in-use resource level could be tracked by a resource counter which may be incremented when resource is allocated for a request (e.g. on receipt of the corresponding request) and decremented when resource is freed (e.g. on issuing the corresponding response for the request to the requesting node). The in use resource level could be tracked in different ways. In some examples, the in-use resource level may indicate that the amount of resource in use for handling both read requests and the at least one type of atomic data access request. Hence, regardless of which requests have occupied the initial chunk of resource, the last remaining instances of resource can be allocated to atomics only. Alternatively, the in-use resource level could indicate an amount of resource in use for handling read requests but may be independent of the amount of resource in use for handling the at least one type of atomic data access request. For example the resource counter which tracks the in-use resource level could be incremented in response to allocation of resource for a read request but may not be incremented when resource is allocated to an atomic data access request. In this case, if atomic data access requests have already been allocated resource it does not contribute to the in-use resource level used to decide whether reads can be allocated resource, so less additional resource needs to be reserved for atomics. That is, if the initial batch of resources was allocated to reads then the last few instances of resource could be reserved for atomics to ensure that there is always some opportunity for handling atomics, but if enough atomics have already been allocated resource then there is no need to reserve further resource for atomics.

The resource for which allocation is controlled by the resource allocation circuitry can be any resource which is required for handling data access requests which require a read response. The resource could be required in order to allow the request to be issued to the destination (e.g. to gain bandwidth on a bus or space in a downstream buffer), or required for handling of the response which is received back from the destination node.

In one example the data access routing circuitry may have a buffer for storing information associated with data access requests requiring a read response, and the resource allocation circuitry may control allocation of space in the buffer. Hence, certain slots of the buffer could be reserved for handling the at least one type of atomic data access requests, either permanently by providing dedicated slots for atomic data access requests, or by tracking the in-use slots and reserving remaining slots once the in use level exceeds the threshold as discussed above.

The buffer could have various purposes. In some examples the buffer may comprise a read tracker to store tracking information indicating properties of data access requests requiring a read response. For example, the tracking information could specify additional information associated with a data access request received from the requesting node, which is to be excluded from the signals issued to the destination node and then recombined with the read response when the read response is returned from the destination node. For example sometimes the requesting node may append certain information to the data access request, such as trace-related data which assists the requesting node in tracking memory access latency. However such trace-related information or other additional information may not be provided to the destination node, as there may not be an appropriate signal path for issuing such information to the destination node, and in any case the destination node may not need that additional information. Hence, the read tracker could allocate an entry in the buffer for storing this additional information, and then when the read response is received, the additional information can be added to the read data returned from the read response and returned to the requesting node.

Another form of tracking information specified in the buffer could be a request identifier specified for a data access request by the requesting node. The request identifier could be used by the data access routing circuitry for controlling an order in which data access requests specifying the same request identifier are serviced, or for controlling an order in which the responses for such data access requests are returned to the requesting node. Sometimes, a requesting node may require that a certain series of data access transactions are handled in a particular order. To ensure that the data access routing circuitry or circuitry downstream of the data access routing circuitry does not re-order such requests, the requesting node may tag the requests to be handled in order with the same request identifier. Hence, when requests are received the read tracker may buffer the request identifiers for previously received data access requests which are still in progress to ensure that a subsequent request for the same identifier is not handled until the previous request specifying the same identifier has made sufficient progress.

Regardless of the form of the read tracking information stored for each request, some space is required in the buffer for handling the tracking information for a request requiring a read response. If the read requests take all the space in the read tracking buffer, then this could block progress of atomic requests, which leads to a knock on effect on the write requests on the write channel. By reserving space in the read tracker for the at least one type of atomic data access request this problem can be addressed.

Another form of buffer may be a response buffer for storing read responses received in response to the data access requests requiring a read response. For example, the read responses may need to be buffered because some of the destination nodes may return read responses which have a different data width compared to the read responses expected by the requesting node, and so the response buffer may buffer read responses until all of the read responses to be combined into a single response have been received and then provide the combined response to the requesting node. Also, read responses could be buffered to provide for re-ordering of responses. Again, it may be undesirable for an atomic data access request (and hence write requests) to be blocked because read requests have taken all the entries in the response buffer, and so it can be useful to reserve space in the response buffer for atomics.

Another example of resource which may be allocated by the resource allocation circuitry may be one or more credits for permitting a data access request requiring a read response to use space in a downstream buffer provided downstream from the data access request circuitry. For example, a memory controller or a router or other component for passing data access requests to the destination node may have buffers for buffering up requests when there is insufficient bandwidth on a downstream signal channel to pass the requests on immediately. Such downstream buffers which are not part of the data access routing circuitry itself may have a knock on effect on performance. The data access routing circuitry may consider the capacity available at such downstream buffers even if the buffer is not part of the data access routing circuitry itself. This can be done by issuing credits to requests and controlling the number of credits that can be issued based on the capacity of the downstream buffer. For example, a counter could track the number of requests that have been issued downstream and if the counter indicates that enough requests have been issued to fill the buffer then further requests can be delayed until a response to an earlier issued request has been received. Hence, the credit control mechanism provided by the resource allocation circuitry for controlling use of the downstream buffer could also reserve credits for the types of atomic data access requests which require both the read and write response. For example, this could be done either by using special credits which can only be used for atomic data access requests, and restricting the number of credits which can be allocated to read requests to less than the total capacity of the downstream buffer, or by sharing the credits between the read and atomic request, but once the number of issued in-use credits has exceeded a threshold, reserving remaining credits for atomics.

The at least one type of atomic data access request may have a number of forms. Any given implementation may only support one of these types of atomic data access requests, or could support multiple types. Hence the at least one type of atomic data access requests may comprise at least one of:

an atomic swap request specifying the target address and a further operand, for triggering the destination node to return the read response providing the data read from the target storage location and to return the write response confirming servicing of an unconditional write operation for writing the further operand to the target storage location;

an atomic compare-and-swap request specifying the target address, a swap operand, and a compare operand, for triggering the destination node to return the read response dependent on the data read from the target storage location, and to return the write response confirming servicing of a conditional write operation for conditionally writing the swap operand to the target storage location, conditional on a comparison between the data read from the target storage location and the compare operand; and an atomic load request specifying the target address and an additional operand, for triggering the destination node to return the read response dependent on the data read from the target storage location, and to return the write response confirming servicing of a conditional or unconditional write operation to write a result value to the target storage location, the result value comprising a result of an arithmetic or logical operation applied to the additional operand and the data read from the target storage location.

These types of atomic data access request need not be the only types of atomic data access request supported and further atomic data access requests which require both the read and the write response may also be provided.

Also, in some cases the system may also comprise a further type of atomic data access request which only requires a write response but does not require a read response. Such a request may be considered atomic because the write to the target storage location may be dependent on a value read from the target storage location so that it still requires both a read and a write to be performed atomically at the destination node. However, if it is not necessary for the requesting node to receive the value read from the target storage location then only a write response confirming servicing of the write operation may be required. For such atomic data access requests which do not require a read response, these can be handled in a similar way to write requests and so do not need any read resource to be allocated. Therefore, the reserved read resource may not be used for such a further type of atomic data access request. Hence, it is not necessary to reserve resource for all types of atomic data access request.

FIG. 1 schematically illustrates an example of a data processing system 2 (e.g. an integrated circuit or system-on-chip) having data access routing circuitry 4, 6 for routing data access requests between requesting nodes and destination nodes and routing the responses to such data access requests from the destination nodes to the requesting nodes. In this example the system 2 includes a number of master devices, such as: one or more central processing units (CPUs) 6 or clusters of CPUs; a graphics processing unit (GPU) 8; a USB master 10 for controlling interaction with devices over a universal serial bus (USB); a PCIe controller 12 for controlling interaction with devices connected to the system 2 over a PCI Express bus; a digital signal processor (DSP) 14; a display controller and/or image signal processor 16; a video controller 18; a system controller 20, which could provide a number of system control functions such as controlling direct memory access operations, controlling security operations such as encryption or other on chip security operations, or controlling interaction with peripherals; and a modem system controller 22 for controlling communications via a modem. The system controller 20 and modem system controller 22 may have a network interface controller (NIC) 24. All of the masters 6 to 22 may be capable of acting as a requesting node for issuing data access requests to be serviced by a destination node of the system.

The system may have a number of components which may act as destination nodes, for example including a number of memory controllers 26 for controlling access to dynamic random access memory (DRAM); a memory controller 28 for controlling access to static random access memory (SRAM); a memory controller 30 for controlling access to a read only memory (ROM); a flash memory controller 32 for controlling access to flash memory; a peripheral controller 34 for controlling access to peripheral devices; and a network interface controller 36 for controlling interaction with remote devices or further peripherals via a network interface. Also the destination nodes may include a system cache 38 within the data routing circuitry 4, 6, which can cache some data from the memory system 26-36 so that some data access requests can be serviced without needing to pass them on to a downstream memory component. Also, a configuration element within the routing circuitry 4, 6 itself, such as a control register defining one or more software-configurable parameters for controlling the operation of the routing circuitry 4, 6, could act as destination nodes for data access requests specifying a memory address mapped to the configuration element.

In the example of FIG. 1, some of the masters 6, 8 are coupled via a cache coherent interconnect 4 which is responsible for managing coherency between cached data held by the respective master's caches. The cache coherent interconnect may have a snoop filter 40 for tracking data cached in particular masters' caches and may respond to read and write data access requests specifying a target address by issuing snoop transactions to check for the coherency status of data associated with the target address cached in other masters, so that if one master requests read or write access to data, then data for the same address in another master's cache can be invalidated, or if dirty, the latest value in that other master's cache can be provided to the requesting master and/or written back to the memory system. Any known coherency protocol could be used for the cache coherent interconnect 4.

The other masters 10 to 22 (which may not comprise a cache) do not need to be connected via the cache coherent interconnect 4. A system interconnect 6 couples the outputs of the cache coherent interconnect 4 and the non-cached masters 10 to 22 with the respective destination devices 26 to 36. The system interconnect 6 is used for routing of transactions to a target destination node selected based on the target address specified by the request, and for routing of the responses back to the requesting node. The system interconnect 6 does not need to take responsibility for management of coherency between cache data in respective masters.

In this example, the system interconnect 6 is implemented as a network on chip (NoC) which comprises a number of routers 44 for coupling a number of master interfaces 46 (from which data access requests can be received from respective master devices 6-22) to a number of destination interfaces 48 (for outputting the requests to respective destination devices 26-36). Each master interface 46 is responsible for decoding the address specified by the data access request to identify the particular route to be taken through the network on chip 6 via the routers 44 to reach a destination interface 48 associated with the selected destination node which is to service the data access request. In some cases the master interface 46 may also translate the protocol used for the request asserted to the network on chip 6 into an internal representation to be used for routing the request across the network on chip 6. If the requests are translated into an internal protocol, then the destination interfaces 48 may translate them back into the original protocol used by the request in order for servicing by the destination. Alternatively, some of the destination nodes may handle the request directly in the form used by the network on chip 6 so that no translation would be needed at the destination interface. For each destination interface 48, when it receives the response to a data access request from the destination node 26-36, the destination interface 48 issues that response back along the path taken by the corresponding request to the master interface 46 which issued the request, and the master interface 46 then returns the response to the requesting node.

A network on chip 6 as shown in FIG. 1 can be useful when there are a large number of master and destination devices to be connected, as the arrangement of routers 44 can be designed bespoke for the requirements of a given system in order to provide for an appropriate level of bandwidth and to provide sufficient number of routers that the physical distance over which requests have to be routed on the chip can be accommodated without significant loss of signal amplitude. For pairs of requesting and destination nodes which are expected to require a large amount of traffic then additional routers or signal channels can be provided between them, while other pairs of requesting/destination nodes may have less capacity.

The use of a network on chip is not essential and in other examples a different topology could be used within the system interconnect 6. For example, a series of point to point connections between the master and destination interfaces could be used, or a ring topology may be used in which all requests are asserted onto a ring bus and then circulate round until they reach the required target interface. Also, a mesh topology could be used where each interface 46, 48 is connected to a point on a grid and requests and responses may traverse between the points on the grid associated with the corresponding master and destination interfaces 46, 48. However, use of a network on chip can enable better scaling as the number of master and destinations increases.

Figure 2:
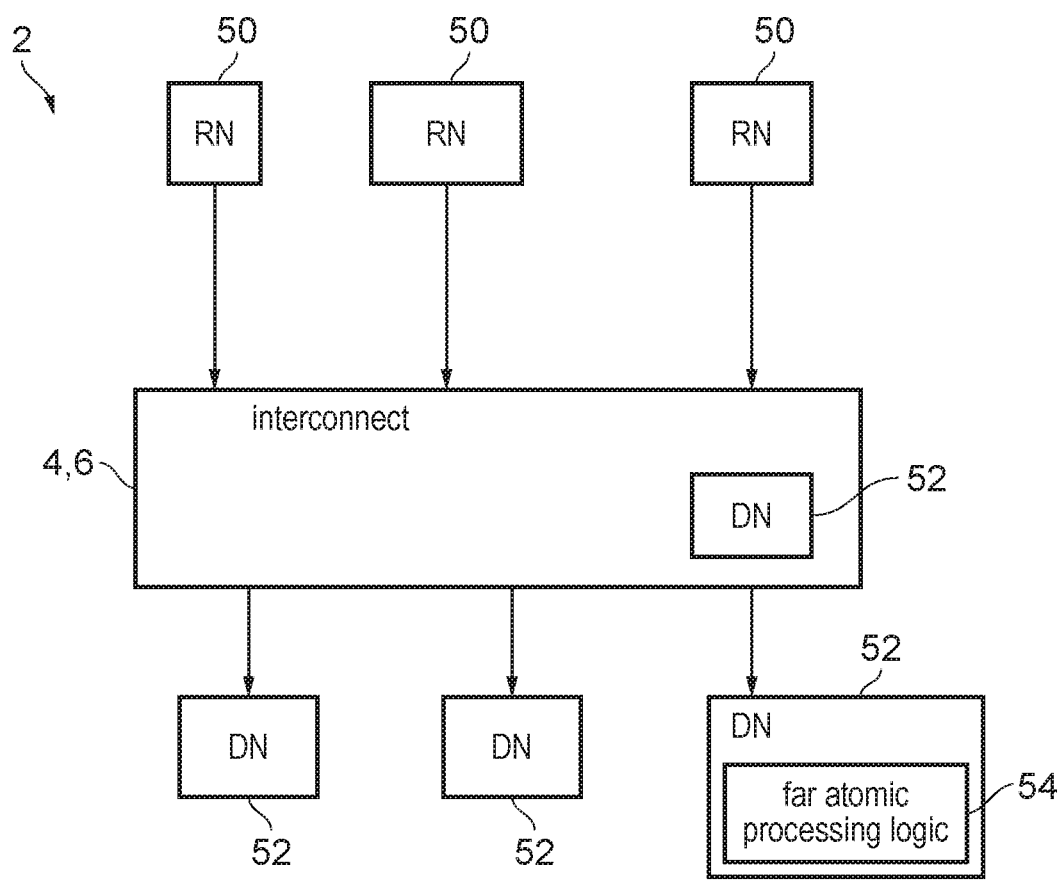
FIG. 2 shows an example of a destination node having far atomic processing logic for processing atomic data access requests requiring both a write response and a read response.

FIG. 2 shows a diagram illustrating use of an interconnect 4, 6 within an integrated circuit 2 or system on chip. In general the interconnect may receive requests from a number of requesting nodes 50, which could be any of the masters 6 to 22 shown in FIG. 1. The interconnect acts as data access routing circuitry to control routing of the requests to a destination node 52, which could be a system cache 38 within the interconnect or one of the downstream destinations 26 to 36 described in FIG. 1. The address specified by the request is used to select which destination is to service the request. When the request has been serviced by the destination node, a response is returned by the destination node 52 and the response is provided back to the requesting node 50.

As shown in FIG. 2, at least one of the destination nodes may comprise far atomic processing logic 54 which can perform an atomic operation in response to an atomic data access request triggered by one of the requesting nodes. The atomic operation may include both a read and a write and may involve an arithmetic or a logical operation being applied to the value read by the destination node in order to determine which value should be written back to the target storage location.

FIG. 3 shows a table summarising a number of types of data access requests which may be supported by the interconnect 4, 6 the request types include the following:

Read request. The requesting node (RN) 50 issues a read request specifying a target address, and in response the destination node (DN) 52 returns a read response providing data read from a target storage location (the "addressed location") identified by the target address.

Write request. The RN 50 issues a write request specifying a target address and write data (Wdata) in response, the DN 52 returns a write response confirming servicing of a write operation to write Wdata to the addressed location.

Atomic store. The RN 50 issues an atomic store request specifying a target address and the Wdata. In response, the DN 52 returns a write response confirming servicing of a write operation to write, to the addressed location, a result of a certain processing function applied to the Wdata and the data read from the addressed location. The function applied to the read data and the Wdata could, for example, be an arithmetic operation such as an add or subtract operation, or a logical operation such as logical AND, logical OR, or logical XOR. Also the function could be a comparison function, such as returning the maximum or minimum of the Wdata and the read data. In some cases the write operation could be a conditional operation, since if the function is the maximum or minimum function and the data read from the addressed location turns out to be the maximum or minimum value already, then it may not be necessary to write any value to the addressed location as the old value already has the correct value. Hence, there may be a number of forms of atomic store operation provided, each corresponding to a different function applied to the write data and the read data, in order to determine what value should be stored in the addressed location.

Atomic load. The RN 50 issues an atomic load request specifying a target address and the Wdata. In response the DN 52 returns a write response confirming servicing of a write operation to write, to the addressed location, a result of a function of the Wdata and the data read from the addressed location. The function may be any of the types of functions discussed above for atomic store. Also, the DN 52 returns a read response which provides either the old data read from the addressed location or the new data which resulted from the write. Hence, the atomic load request is handled in the same way as an atomic store, except that also the old or new data of the addressed location is returned to the RN 50 in a read response.

Atomic swap. The RN 50 issues an atomic swap request specifying the target address and the Wdata. In response the DN 52 performs an unconditional write operation to write Wdata to the addressed location and returns a write response confirming that the write operation has been serviced. Also, the DN 52 returns a read response providing the old data which was read from the addressed location (i.e. the data which was stored in the addressed location prior to performing the write).

Atomic compare. The RN 50 issues an atomic compare request specifying the target address, a compare data value (Cdata) and a swap data value (Sdata). The Cdata and Sdata can both be encoded on the write data channel which would be used for conveying the Wdata for the write request or one of the other forms of atomic request. In response to the atomic compare request, the DN 52 returns a write response confirming servicing of a conditional write of the Sdata to the addressed location. The conditional write is conditional on a comparison between the Cdata and the data read from the addressed location. For example, the Sdata could be written to the addressed location on condition that the data read from the addressed location is equal to the Cdata, is not equal to the Cdata, or is greater than or less than the Cdata, as desired. Some implementations may support the far atomic processing logic 54 implementing different forms of comparison while other systems may only provide for a certain default comparison such as the equals comparison. In addition to the write response, the DN 52 also provides a read response which provides either the old data of the addressed location before the write, the new data which is in the addressed location following the write, or some indication of the comparison result, such as whether the comparison criterion was passed or failed.

Hence, in general read requests trigger the DN 52 to provide a read response which depends on data read from the addressed location. Write requests or atomic store request return a write response which confirms servicing of the write operation to write data to the addressed location. The atomic load, atomic swap and atomic compare requests are forms of atomic data access request which require both the read response and a write response. Note that returning of the write response does not imply that the actual writing of the data to a certain storage location in memory has already taken place. In some cases the write response may be returned when the data access request has been serviced and made sufficient progress that it is guaranteed that the request will be carried out and will not be reordered relative to subsequently received requests, but may not imply that the data has already been written. For example, in some cases a write response could be returned by memory controller once information associated with the write request or atomic request has been written into a buffer from which the memory then takes the values and writes them to the memory and so sometimes the write response could be returned before the actual write of the final memory location has taken place. In general the write response may be sufficient for the requesting node to have confidence that the write is guaranteed to take place and any subsequent requests will take account of the effects of the write.

Not all destination nodes 52 need to support the atomic requests. Some destination nodes which do not have the far atomic processing logic 54 could only support the read and write request. However, the use of atomics can be useful for improving performance in scenarios where a number of requesting nodes need to access shared data in memory. If the atomic requests were not supported, then if one master needs to perform both a read and a write to a certain storage location without any other master intervening between the read and the write, it would have to issue a read request to read the data value from the destination node and return it into the master's own cache or processing logic and then perform the required operation on that read value locally at the requesting node 50. For example, the requesting node could calculate the function of the write data and the data read from the addressed location as required by the atomic store or atomic load request or could perform the comparison as performed by the atomic compare request. Having determined what value then needs to be written back to memory the requesting node 50 could then issue a write request which controls the destination node to update the addressed location with that data. With this approach there is a long delay between the issuing of the read request to read the data from the addressed location and the write response being received in response to the subsequent write to update that location, and during this time other requesting nodes may be blocked from accessing that address (e.g. using a lock-based mechanism where a lock variable is used to control exclusive access to certain addresses by a particular master). This can be harmful for performance because those other masters may have to stall their operations until the lock is released and they can then interact with the shared resource. This can be a particular problem for cases where a number of masters (or a number of processes executing in software on the same master) each need to update some variable, such as a counter counting a number of events of a certain type, and it is important to ensure that any updates to that variable are performed atomically to avoid certain updates being missed if one master reads a value of the variable between the read and write requests issued by another master or another software process.

These issues can be reduced by using the atomic requests because they allow the destination node itself to perform both the read and the write required for implementing such operations and this greatly reduces the time between the read and the write and also simplifies management of the atomic nature of the operation because it need not rely on setting of lock variables in order to prevent other processes accessing the address between the read and the write, since the destination node itself may handle atomic requests as a single operation and not allow other read or write requests to be handled partway through the atomic operation.

Figure 4:
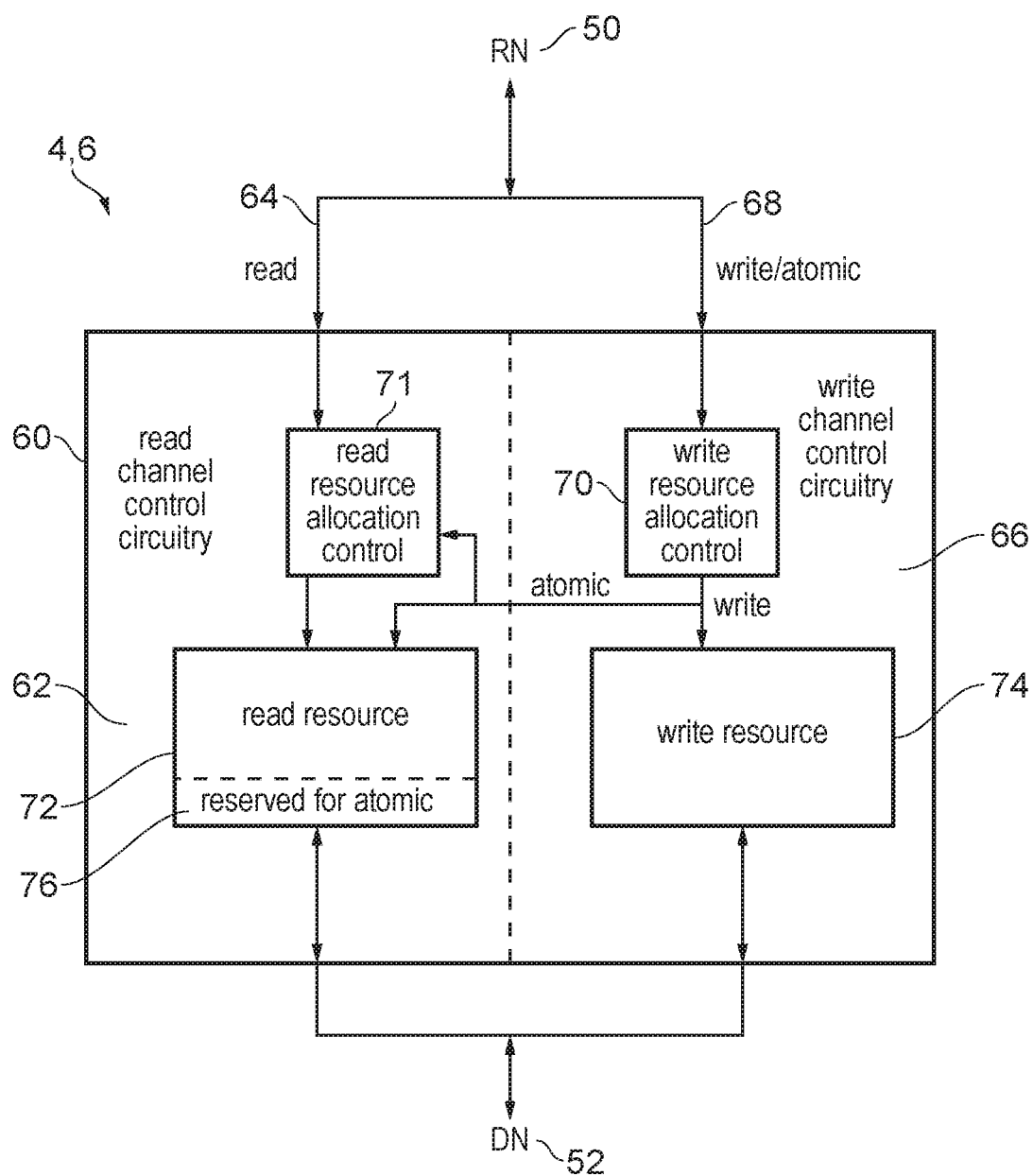
FIG. 4 shows an example of data access routing circuitry having resource allocation circuitry to control allocation of resource for handling data access requests.

FIG. 4 shows a schematic illustration of routing control circuitry 60 which may be provided within one of the interconnects 4, 6. For example, the routing control circuitry 60 could be one of the master interfaces 46 of the network on chip 6. Alternatively, the routing control circuitry could be circuitry within the cache coherent interconnect 4 which controls which destination port of the interconnect a particular request is routed to. The routing control circuitry 60 is shown as handling requests from one particular requesting node 50 and directing request to one particular destination node 52, however in practice it will be appreciated that the destination node may be selected from among two or more destination nodes which can be accessed by the requesting node. Also, in some cases the routing control circuitry 60 could be shared between multiple requesting nodes.

The routing control circuitry has read channel control circuitry 62 for handling read requests received on a read request channel 64 from the requesting node 50, and write channel control circuitry 66 for handling write requests and atomic requests received on a write channel 68. In some cases read requests may be received over separate signal paths to the write and atomic requests, so that the read channel 64 and write channel 68 use physically separate wires. Alternatively, a combined bus or signal path could be used for conveying both read and write requests from the requesting node 50 to the routing control circuitry 60, but the allocation of resources for handling such requests may be managed separately for each channel within the routing control circuitry by corresponding read/write resource allocation control logic 70, 71. By providing separate resource management for the read request compared to the write and atomic request this can enable more efficient processing since it reduces the chance that writes are blocked by reads or vice versa which can improve performance.

As atomic requests may specify write data, compare data or swap data, it may be convenient, the atomic request are received on the write channel so as to share data paths used for conveying the data associated with write requests within the routing circuitry. Read requests do not specify any data and so do not need to use such data paths for the write data. However, the atomic load, atomic swap and atomic compare requests may require resource to be allocated both on the read channel side and on the write channel side because they require both a read response and a write response. Hence, the write resource allocation control circuitry 70 in the write channel may be responsible for allocating resource in the read channel as well (either directly or by controlling the read resource allocation control circuitry 71 to allocate read resource for the atomic request on its behalf). The allocated resources could be of a number of types. In some cases, the read resources 72 may include buffer space for buffering read requests or the responses to the request that are received from the destination node, or credit for controlling allocation of resources downstream from the routing control circuitry 60. Similarly, the write resource may also include buffer space or credits.

As shown in FIG. 4 a portion of the read resource 76 is reserved for the types of atomic request which require both a read and write response. Atomic stores do not require a read response and so can be handled in a similar way to write.

Figure 5:
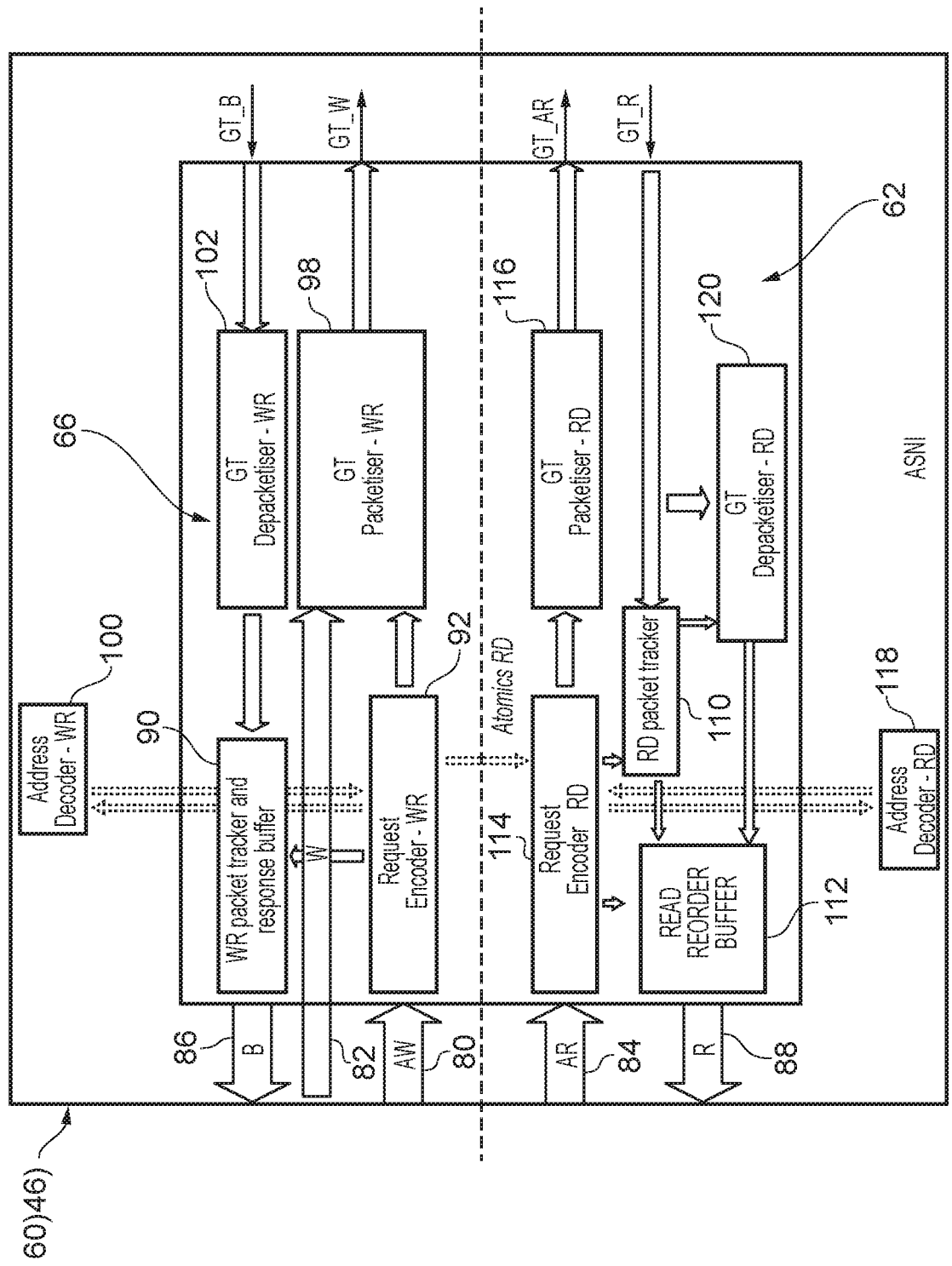
FIG. 5 shows an example of the data access routing circuitry in more detail.

FIG. 5 shows a more detailed example of the routing control circuitry 60 which in this example corresponds to one of the master interfaces 46 in the network on chip. The write channel control circuitry 66 is shown in the upper portion of the diagram and the read channel control circuitry 62 is shown in the lower portion. The signal path for communicating with the requesting node 50 includes a number of channels including a write request channel 80 (AW) for providing the write request specifying the target address, a write data channel (VV) 82 for providing the write data (or compare/swap data) for write/atomic requests, and a read request channel (AR) 84 for providing the address of a read request. The signal path also includes response channels, including a write response channel (B) 86 for providing the write response to the requesting node and the read response channel (R) 88 for providing the read response which provides the read data in response to a read request.

The write resources on the write channel include a write request packet tracker/response buffer 90 which comprises a number of buffer entries or slots for storing tracking information for a corresponding write request or atomic request and buffering corresponding write responses. When a write or atomic request is received over the write channel a request encoder 92 allocates an entry in the write tracker/response buffer 90 for that request which specifies tracking information such as an identifier of the request. When a response is subsequently received from the destination node then it is allocated into the previously allocated slot of the write tracker/response buffer 90, which controls the order in which the responses are provided to the requesting node based on the tracking information. Transactions with the same identifier may be required to be handled in the order in which they are received from the requesting node without reordering. The tracker/buffer 90 may also specify additional information (e.g. trace-related tags) to be combined with write responses.

When the write request or atomic request is received on the write channel, the request encoder 92 determines whether that request is ready to be issued. For example, some quality of service criteria may be imposed to limit, for example, the number of outstanding write requests pending at one time, or the number of requests issued in some time period. The request encoder 92 may also determine whether the write request or atomic request can be issued in dependence on whether there is spare resource in the packet tracker 90. If either the quality of service criteria restrict issue of the write request, or there is no space in the packet tracker 90, then the write request can be stalled. If the write request is ready to issue, the write request encoder 92 controls issuing of the request to downstream elements. A packetiser 98 translates the write request or the atomic request into network packets to be output on the network on chip 6, and the request is output over the network on chip 6 to the selected destination node. As part of generation of the packet to be sent over to the network, an address decoder 100 determines, based on the target address specified over the write address channel 80, which destination interface is selected and generates routing information which is appended to the network packet to control routing through the appropriate sequence of routers 44 to reach the destination interface 48. When a write response is received from the destination node then a de-packetiser 102 interprets the packet and converts it back into a format appropriate for sending to the request node. The response may be placed in the buffer 90 and may be delayed in the buffer for some time if some reordering is required depending on the tracking information set when the request were received.

On the read side, the read channel control circuitry 62 comprises a number of resources for read requests which include a read packet tracker 110 for storing tracking information associated with received read requests and a read re-order buffer 112 which buffers the responses to read requests or atomic requests so that they can be re-ordered or assembled into a combined response. A read request encoder 114 determines when read requests are ready for issue.

Again, this may depend on quality of service criteria as well as on availability of read resource such as space in the read packet tracker 110 or the read re-order buffer 112. The read packet tracker 110 may specify tracking information including transaction identifiers which may be used for controlling ordering of transactions. Also the read packet tracker 110 could specify additional information such as trace-related information which is not sent downstream for a read request but is instead stored within the packet tracker and then reassembled with the read response when the read response is returned to the requesting node.

Hence, when a read request is received on the address channel 84, the request encoder 114 on the read side determines whether the quality of service requirements permit issuing of the request and whether there is sufficient resource available for handling the read request in the buffers 110, 112, and if so issues the read request to a read packetiser 116 which generates packets in the appropriate format for sending over the interconnect. When a request is issued, space is allocated in the read packet tracker 110 or read re-order buffer 112. A read address decoder 118 decodes the address of the read request to identify the selected destination node to which the packets should be routed by the interconnect. In some cases the write and read address decoders 100, 118 could be the same decoder. When a read response is received in response to a read or an atomic request, the response is provided to the read de-packetiser 120 which interprets the received response packet and generates a response to be allocated to the read re-order buffer 112. The response is returned to the requesting node via signal path 88.

In interconnects which do not provide for protocol translation at the interfaces of the interconnect, the packetizing/depacketizing logic 98, 102, 116, 120 may not be required, and instead read or write requests could be forwarded in the same form as which they are received from the master device.

As atomic data access requests are received on the write channel but may require allocation of read resource, the write request encoder 92 may also trigger allocation of resource on the read side of the routing control circuitry. Hence, for one of the types of atomic requests which requires both a read and a write response the request encoder 92 may allocate space both in the write packet tracker 90 and in the read packet tracker 110 or read re-order buffer 112. However, if all the space in the read buffers is already taken then this could block the atomic request which could then block other write requests on the write channel.

Figure 6:
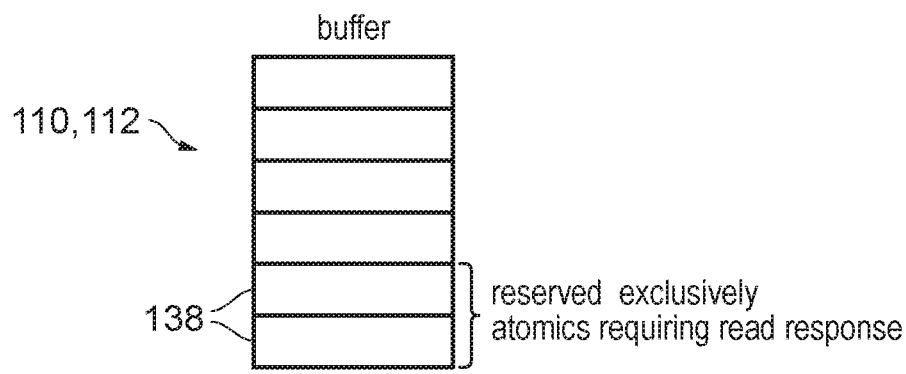
FIGS. 6 and 7 show two examples of controlling allocation of buffer space for read and atomic data access requests.

Therefore as shown in FIG. 6, some of the slots 138 in the buffers 110, 112 may be reserved exclusively for the atomic requests which require a read response, so that they cannot be used for normal read requests received on the read channel 84. This means that there is always some space guaranteed to be available for atomics which avoids the write being blocked by heavy volume of traffic on the read channel.

Figure 7:
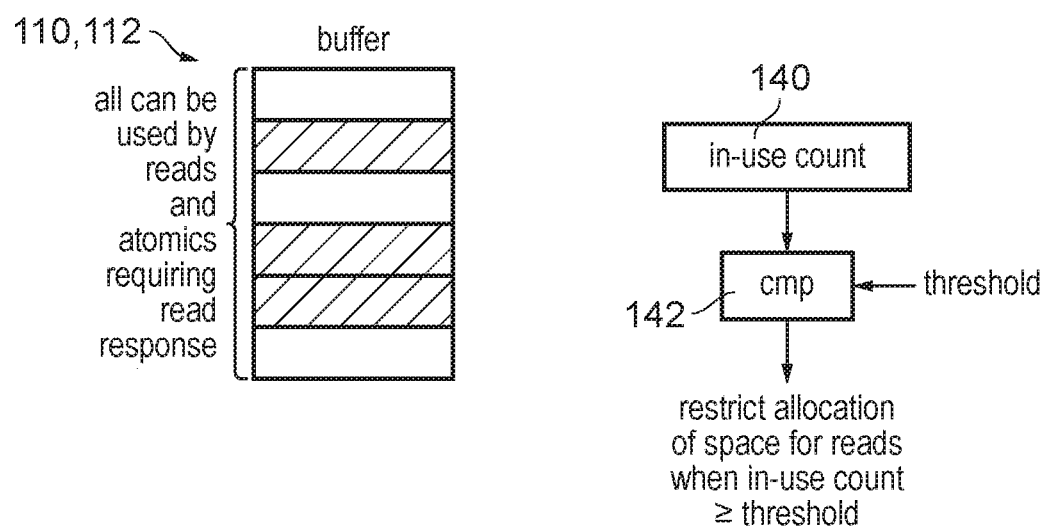

As shown in the alternative approach shown in FIG. 7, all the entries of the buffers 110, 112 could be used for either read requests or the types of atomic requests which require a read response. However, a counter 140 may be provided to track how many entries of the buffer are currently in use. When a comparator 142 determines that the current in use count is greater than or equal to a certain threshold then allocation of any remaining space may be restricted for read requests and reserved for atomic request which require a read response. The incrementing of the in use counter 140 could be performed either in response to any request which leads to allocation of space in one of the read buffers 110, 112, or could be incremented solely when a read request is received so that occupation of an entry by information associated with an atomic request does not trigger incrementing of the in use count. Either way, by using the in use count to track the occupancy of the buffer and ensuring that the threshold is set to less than the total capacity of the buffer so that there will always be some entries of the buffer which can be used by atomics (even if these are not always the same entry), this can improve performance for systems which support atomic transactions. The counter 140 is decremented when a response to a request which previously triggered a counter increment is received.

Figure 8:
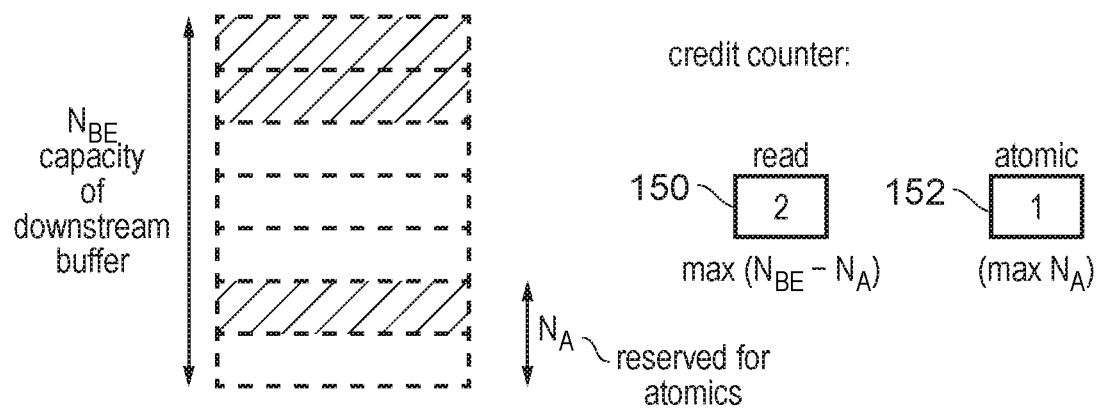
FIGS. 8 and 9 show two examples of controlling allocation of credits for controlling access to a downstream buffer for read and atomic data access requests.
Figure 9:
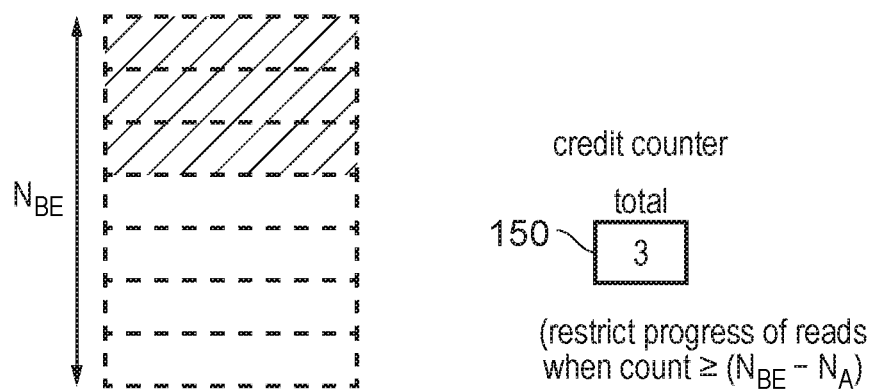

Similarly, FIGS. 8 and 9 show cases where the read/write resource allocation control circuitry 70, 71 within the routing circuitry as shown in FIG. 4 may manage allocation of resource in a downstream buffer which is located downstream from the routing control circuitry 60 rather than being a buffer within the routing control circuitry itself. In this case, the read or write resource allocation control circuitry 70, 71 may maintain one or more credit counters 150 which track anticipated occupancy of the downstream buffer. Some credits could be reserved for atomics so that they cannot be used by read requests. For example as shown in FIG. 8 separate credit counters 150, 152 may track the number of entries used by read requests and atomic requests respectively. The read counter may saturate at a value corresponding to the difference between the total capacity of the downstream buffer ($N_{BE}$) and the number of entries ($N_A$) of the downstream buffer which are reserved for atomic requests and when the read counter 150 reaches saturation then no further reads may be accepted. The atomic request may use special atomic credit counters 152 saturating at $N_A$ so that there is always space in the downstream buffer for such atomics. In some cases, even if all atomic credits have been used, the atomic requests may still be allowed to use one of the read credits tracked by read counter 150.

Alternatively, as shown in FIG. 9 a single counter 150 may track total number of credits issued. The issuing of further read requests may be restricted when the current count value is greater than the difference between the number of total entries of the downstream buffer ($N_{BE}$) and a certain number of entries ($N_A$) to be reserved for atomics.

Hence, as shown in FIGS. 6 to 9 there are a number of resources whose use can be managed by the routing control circuitry and for which some of the resource may be reserved for handling atomics.

Figure 10:
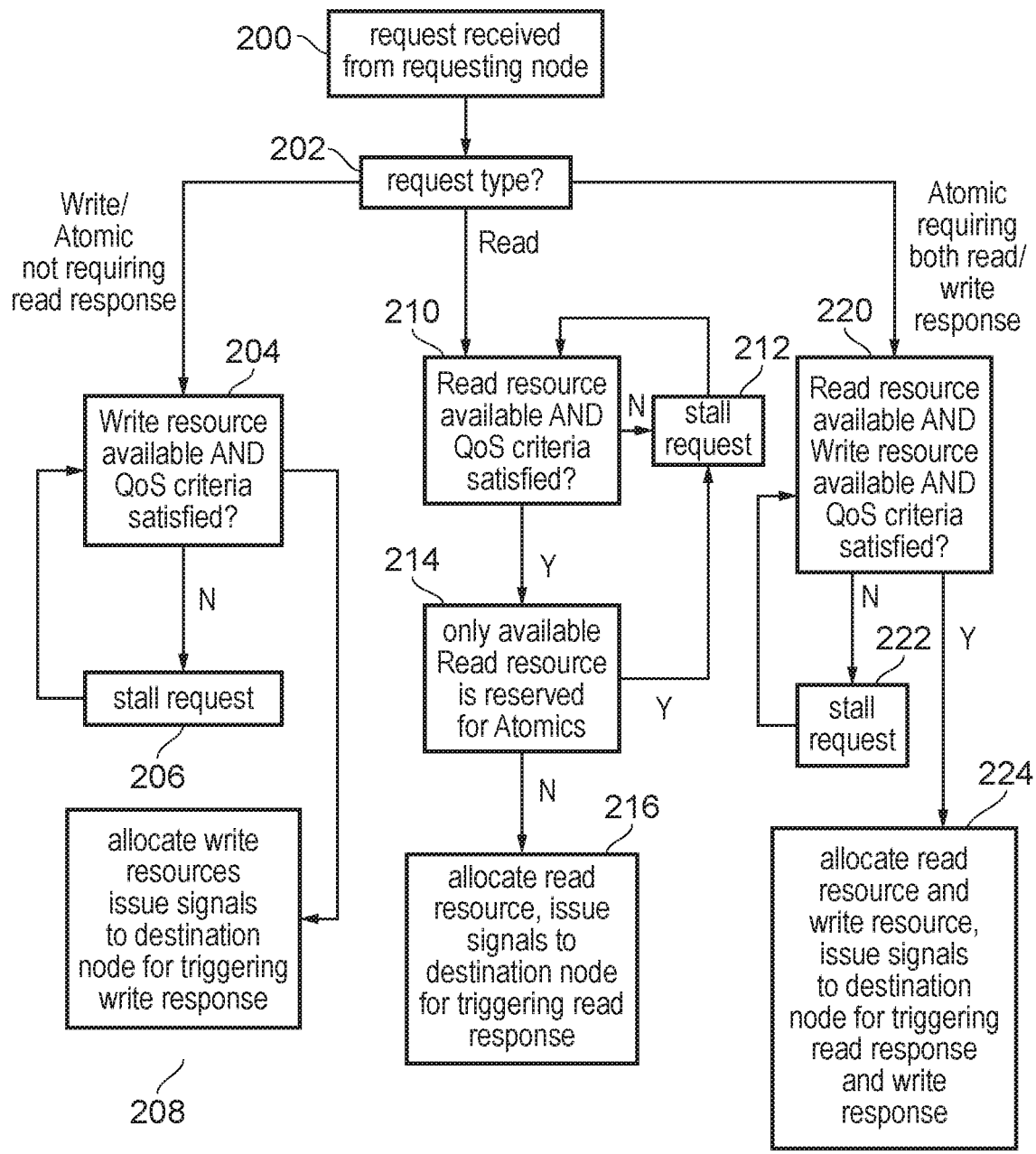
FIG. 10 is a flow diagram showing a method of controlling processing of data access requests via data access routing circuitry.

FIG. 10 shows a flow diagram showing processing of data access requests by data access routing circuitry such as an interconnect or network on chip. At step 200 a request is received from a given requesting node 50. At step 202 the data access routing circuitry 4, 6 determines the type of request that has been received.

If the request is a write request or an atomic request which does not require a read response, then at step 204 the data access routing circuitry 4, 6 determines whether there is sufficient write resource available for handling the request, and whether any quality of service criteria (imposed in order to manage competing access to interconnect resource by different masters) are satisfied. If either there is no write resource available, or the quality of service criteria are not satisfied, then at step 206 the request is stalled and the request waits until write resource is available and the quality of service criteria is satisfied. For example the quality of service criteria could specify that only a certain maximum of number of write or atomics not requiring a read response are allowed to be outstanding at a given time or can limit the maximum number of such transactions which can be serviced within a given time period. When the write resource available and the quality of service requirement is satisfied then at step 208 write resource is allocated for handling the request and signals are issued to the destination node 52 for triggering a write response which confirms servicing of a write operation to write a data value to a target storage location identified by the target address specified by the request. The write operation could be a conditional or an unconditional write operation. The return of the write response may indicate that the request has been serviced so as to make progress to a predetermined point (which does not necessarily indicate that the data value has already been written to the write target storage location).

If at step 202 the request was determined to be a read request, then at step 210 it is determined whether any read resource is available and whether any read quality of service criteria are satisfied (again, such as whether the number of read requests issued in a certain recent time period is less than a certain threshold, or whether the number of currently outstanding read requests is less than a threshold). If there is no read resource available or the quality of service criteria are not satisfied, then at step 212 the read request is stalled. Also, if at step 214 it is determined that there is read resource available, but the only available read resource is reserved for atomic requests only, then again at step 212 the request is stalled. If read resource is available that is not reserved for atomics and the quality of service criteria are satisfied, then at step 216 the read resource is allocated for handling the read request and signals are issued to the destination node selected based on the address of the request. These signals trigger the destination node 52 to return a read response which provides data dependent on a data value read from the address storage location.

If at step 202 the request was determined to be a type of atomic data access request which requires both a read and a write response, then at step 220 it is determined whether there is read resource available and write resource available, and any quality of service criteria imposed on the request are satisfied. As the atomic request requires both the read and the write response in some cases it may be subject to both the read and the write quality of service criteria. If either the read or the write resource is not available or the quality of service criteria are not satisfied then at step 222 the request is stalled. When the read and write resource are available and the quality of service criteria are satisfied then at step 224 both read and write resource is allocated for handling the atomic request and signals are issued to the destination node for triggering the destination node to provide both the read response and a write response.

In some implementations the present technique may be implemented in a physical integrated circuit manufactured to have the interconnect or other form of data access routing circuitry discussed above.

However, the present technique may also be embodied in an integrated circuit design file which provides an electronic design representation of components of an integrated circuit to be manufactured. For example, the electronic design file may specify, e.g. using RTL or some other circuit representation language, the components of the interconnect to be provided, which can then be used by a downstream party to control the manufacture of the integrated circuit. For example, the design file could specify the low level transistor or gate level layouts of the interconnect, or could specify the components of the interconnect at a higher level such as using blocks or standard cells to identify the placement of certain standard components so that the low level transistor or gate level representation can later be looked up from a library of standard components in order to identify the final integrated circuit layout. Hence, in some embodiments the electronic design file representing the integrated circuit design may include a definition of some components which comprise data access routing circuitry to manage allocation of resource for handling read, write and atomic requests and to reserve resource for atomic request which cannot be used by reads.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An apparatus comprising:
   data access routing circuitry responsive to a data access request received from a requesting node specifying a target address, to issue signals for triggering a selected destination node selected from among a plurality of destination nodes to service the data access request;
   wherein when the data access request is a read request received from the requesting node over a read request channel, the data access routing circuitry is configured to issue signals for triggering the selected destination node to provide a read response dependent on data read from a target storage location identified by the target address;
   when the data access request is a write request received from the requesting node over a write request channel, the data access routing circuitry is configured to issue signals for triggering the selected destination node to provide a write response confirming servicing of a write operation for writing data to the target storage location;
   when the data access request is at least one type of atomic data access request received from the requesting node over the write request channel, the data access routing circuitry is configured to issue signals for triggering the selected destination node to provide both the read response and the write response;
   the data access routing circuitry comprises resource allocation circuitry to control allocation of resources for handling data access requests which require a read response; and
   the resource allocation circuitry is configured to reserve at least some of the resources for handling the at least one type of atomic data access request and prevent usage of the reserved resources for handling read requests.

2. The apparatus according to claim 1, wherein at least a portion of the resources for which allocation is controlled by the resource allocation circuitry is shared for use by both read requests and the at least one type of atomic data access request.

3. The apparatus according to claim 1, wherein the data access routing circuitry comprises:
 read channel control circuitry to manage allocation of resources for data access requests received on the read request channel; and
 write channel control circuitry to manage allocation of resources for data access requests received on the write request channel.

4. The apparatus according to claim 1, wherein the data access routing circuitry is configured to stall a read request when the only available resources for handling read requests or atomic data access requests which require a read response is the reserved resources.

5. The apparatus according to claim 1, wherein the reserved resources comprises dedicated resources reserved exclusively for handling the at least one type of atomic data access request.

6. The apparatus according to claim 1, wherein when an in-use resource level exceeds a threshold, the resource allocation circuitry is configured to reserve remaining resources for handling the at least one type of atomic data access request.

7. The apparatus according to claim 6, wherein the in-use resource level is indicative of one of:
 an amount of resources in use for handling both read requests and the at least one type of atomic data access request; and
 an amount of resources in use for handling read requests, independent of an amount of resources in use for handling the at least one type of atomic data access request.

8. The apparatus according to claim 1, wherein the data access routing circuitry comprises a buffer for storing information associated with data access requests requiring a read response, and the resources allocated by the resource allocation circuitry comprises space in the buffer.

9. The apparatus according to claim 8, wherein the buffer comprises a read tracker to store tracking information indicative of properties of the data access requests requiring a read response.

10. The apparatus according to claim 9, wherein the tracking information specifies at least one of:
 additional information associated with the data access request to be excluded from the signals issued to the destination node, and recombined with the read response when the read response is returned from the destination node; and
 a request identifier specified for a data access request by the requesting node, for use by the data access routing circuitry in controlling an order in which data access requests specifying the same request identifier are serviced, or for controlling an order in which responses to the data access requests specifying the same request identifier are returned to the requesting node.

11. The apparatus according to claim 8, wherein the buffer comprises a response buffer to store read responses received in response to the data access requests requiring a read response.

12. The apparatus according to claim 1, wherein the resource allocated by the resource allocation circuitry comprises one or more credits for permitting a data access request requiring a read response to use space in a downstream buffer provided downstream from the data access routing circuitry.

13. The apparatus according to claim 1, wherein the at least one type of atomic data access request comprises at least one of:

an atomic swap request specifying the target address and a further operand, for triggering the destination node to return the read response providing the data read from the target storage location and to return the write response confirming servicing of an unconditional write operation for writing the further operand to the target storage location;
 an atomic compare-and-swap request specifying the target address, a swap operand, and a compare operand, for triggering the destination node to return the read response dependent on the data read from the target storage location, and to return the write response confirming servicing of a conditional write operation for conditionally writing the swap operand to the target storage location, conditional on a comparison between the data read from the target storage location and the compare operand; and
 an atomic load request specifying the target address and an additional operand, for triggering the destination node to return the read response dependent on the data read from the target storage location, and to return the write response confirming servicing of a conditional or unconditional write operation to write a result value to the target storage location, the result value comprising a result of an arithmetic or logical operation applied to the additional operand and the data read from the target storage location.

14. A method comprising:
 in response to each of a plurality of data access requests received from a requesting node specifying a target address, issuing signals for triggering a selected destination node selected from among a plurality of destination nodes to service the data access request;
 receiving a read request in the plurality of data access requests from the requesting node, over a read request channel, and then issuing signals for triggering the selected destination node to provide a read response dependent on data read from a target storage location identified by the target address;
 receiving a write request in the plurality of data access requests from the requesting node, over a write request channel, and then issuing signals for triggering the selected destination node to provide a write response confirming that a write operation for writing data to the target storage location has progressed to a predetermined point;
 receiving at least one type of atomic data request in the plurality of data access requests from the requesting node, over a write request channel, and then issuing signals for triggering the selected destination node to provide both the read response and the write response; and
 controlling allocation of resources for handling data access requests which require a read response, wherein at least some of the resources are reserved for handling the at least one type of atomic data access request to prevent usage of the reserved resources for handling read requests.

15. A non-transitory, computer-readable storage medium storing an electronic design file comprising integrated circuit defining data representing a design of an integrated circuit and storing instructions, which when executed by one or more processors, causes the one or more processors to perform the following:
 in response to each of a plurality of data access requests received from a requesting node specifying a target address, issuing signals for triggering a selected destination node selected from among a plurality of destination nodes to service the data access request;

receiving a read request in the plurality of data access requests from the requesting node, over a read request channel, and then issuing signals for triggering the selected destination node to provide a read response dependent on data read from a target storage location identified by the target address;

receiving a write request in the plurality of data access requests from the requesting node, over a write request channel, and then issuing signals for triggering the selected destination node to provide a write response confirming that a write operation for writing data to the target storage location has progressed to a predetermined point;

receiving at least one type of atomic data request in the plurality of data access requests from the requesting node, over a write request channel, and then issuing signals for triggering the selected destination node to provide both the read response and the write response; and controlling allocation of resources for handling data access requests which require a read response wherein at least some of the resources are reserved for handling the at least one type of atomic data access request to prevent usage of the reserved resources for handling read requests.

* * * * *